Sept. 12, 1944.   M. S. JOHNSON   2,357,956
PIPE ANCHORING MEANS
Filed March 6, 1944   2 Sheets-Sheet 1
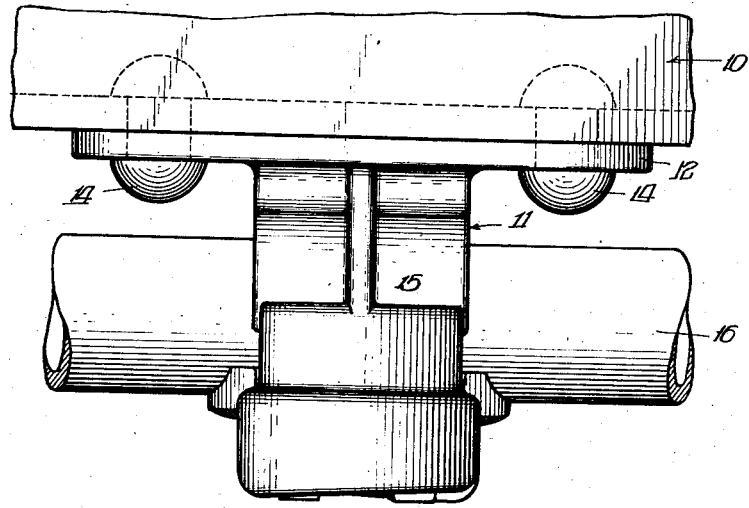
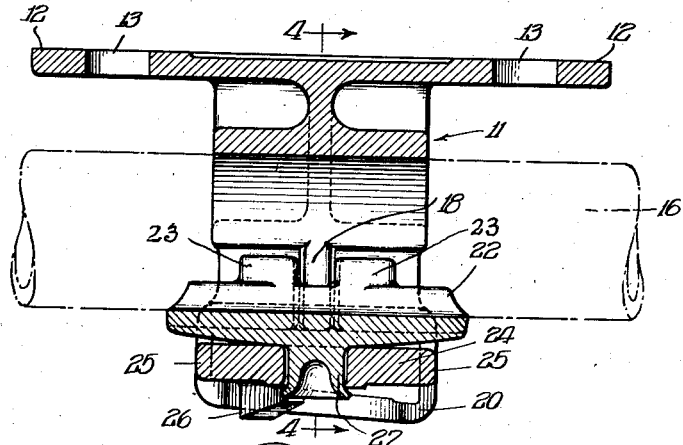
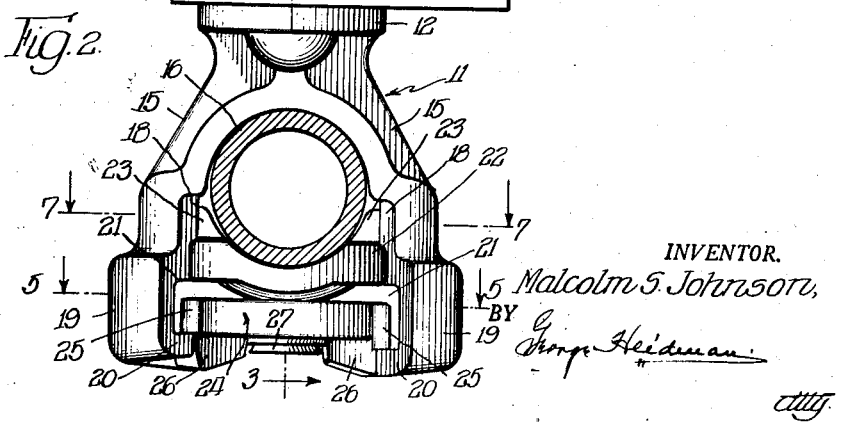
INVENTOR.
Malcolm S. Johnson,
BY Sept. 12, 1944.  M. S. JOHNSON  2,357,956
PIPE ANCHORING MEANS
Filed March 6, 1944  2 Sheets-Sheet 2
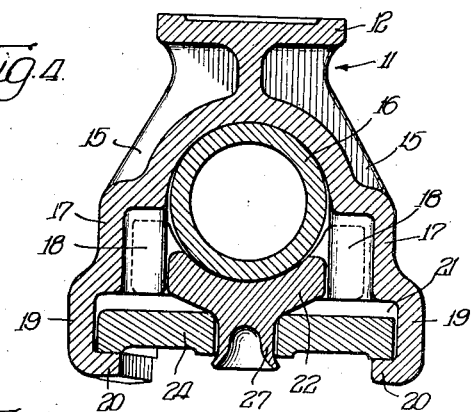
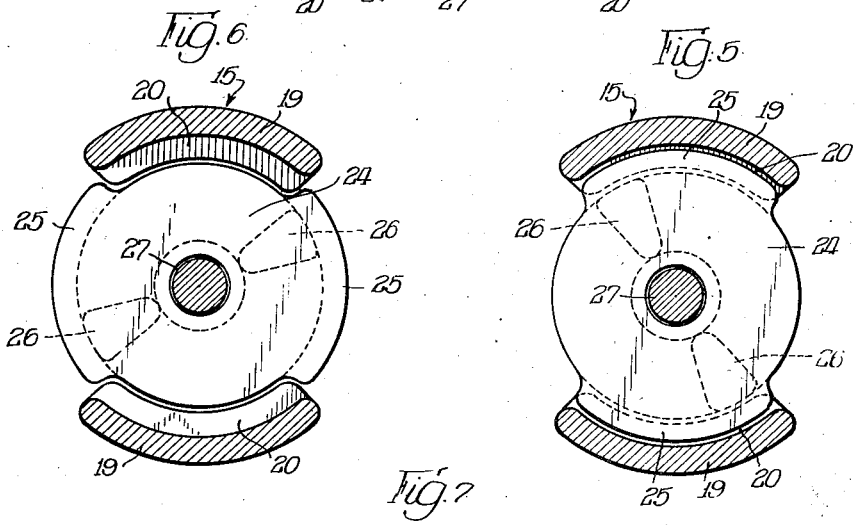
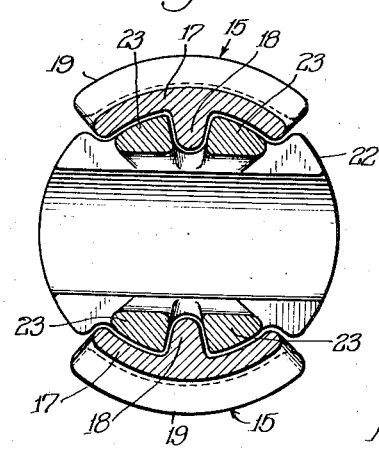
INVENTOR.
Malcolm S. Johnson,
BY Patented Sept. 12, 1944

2,357,956

UNITED STATES PATENT OFFICE 2,357,956

PIPE ANCHORING MEANS

Malcolm S. Johnson, Chicago, Ill., assignor to Illinois Railway Equipment Company, Chicago, Ill., a corporation of Illinois Application March 6, 1944, Serial No. 525,289

6 Claims. (Cl. 248—49)

My invention relates to means for supporting pipes and more especially for firmly clamping the air pipes or lines, of the air brake systems, disposed longitudinally beneath a railroad car so as to firmly hold the same against vibration and movement and thus avoid rupture in the pipe connections which would result in leaky air lines and interfere with proper operation of the air brake system.

The invention contemplates a pipe anchor whose main body portion may be intimately secured to the car underframe and become an integral or permanent part thereof, while at the same time permitting the air pipe or line to be readily renewed if occasion should require without necessitating dismantling or removal of said body portion of my improved anchor.

Another object of my invention is the provision of a symmetrical anchor which will maintain the desired or adjusted clamping relation with the pipe regardless of any longitudinal or lateral movement or vibration of the pipe; the anchor involving a pipe seat or clamping element, which cooperates and interlocks with the main body member against any movement, and a wedging element for removably holding the clamping element in place and for forcing the latter into firm clamping relation with the pipe; a wedging element which, however, is not subjected to any movement of the pipe.

A further object of the invention is the provision of anchoring means which provides a long full bearing for both sides of the pipe and wherein pipe shifting forces are transmitted to the main body member which is integrally secured to the car underframe; the anchoring means being adaptable to variations in pipe size thereby eliminating the necessity for pre-assembly; while at the same time eliminating the need of auxiliary wedge fastening means and of special skill or tools in its installation.

The aforementioned objects and advantages, as well as other advantages inherent in the invention, will all be readily comprehended from the detailed description of the accompanying drawings wherein:

Figure 1 is a side elevation of my improved means secured to a portion of a car underframe with a section of pipe shown clamped in place.

Figure 2 is an end elevation of the means as shown in Figure 1.

Figure 3 is a vertical sectional view taken on the line 3—3 of Figure 2, as viewed by the arrows, with the pipe section shown in dotted lines.

Figure 4 is a vertical section taken along the line 4—4 of Figure 3 as viewed by the arrows.

Figure 5 is a cross sectional view taken substantially along the line 5—5 of Figure 2, looking in the direction of the arrows.

Figure 6 is a similar view showing the unclamped condition of the device.

Figure 7 is a sectional view taken along the line 7—7 of Figure 2 as viewed by the arrows.

In the particular exemplification of the invention, my improved anchor is shown rigidly secured to one of the metallic sills or members of a car underframe, a portion of a sill being shown at 10 in Figure 1, to which the main body member or base casting 11 is rigidly secured; the main member 11 being provided with flanges 12, 12, preferably extending in the direction of the pipe to be clamped as shown in Figures 1 and 3; the flanges having openings 13, 13 to receive the rivets 14, 14, whereby the anchor forms a permanent fixture or part of the car underframe. Although my improved anchor primarily is intended for clamping and supporting the air lines of railroad cars, it is apparent that the anchor is equally well adapted to support rods or pipes intended for other uses and in different localities.

The main member 11 involves the two downwardly flaring side wings or portions 15, 15, whose lower ends are spaced apart a distance sufficient to permit the easy insertion of the pipe of which a section is shown at 16; the juncture between the base and the side wings being of considerable width and made arcuate to provide a long rounded bearing for the upper side of the pipe as shown in Figure 2.

The side wings 15, adjacent the lower side of the pipe, are off-set outwardly as shown at 17 and each off-set portion on its inner face provided with an inwardly disposed vertically extending lug 18 preferably arranged midway between the ends of the anchor, see Figure 3; these lugs 18 being substantially of depth corresponding with the extent to which the wing portions 17 are offset so as not to restrict the opening between the wings.

The lower ends of the side wings beneath the offset 17 are further off-set outwardly as shown at 19, with the bottom edges of the off-sets 19, 19 provided with the inturned flanges 20, 20; the off-set shoulders at the junctures of portions 17 and 19 and the lower flanges 20 providing arcuate channels 21 therebetween. The flanges 20, 20 have oppositely sloping top surfaces; that is to say, the flange 20 of one wing slopes upwardly from one end of the anchor, as shown in Figure 3, while the flange 20 of the other side wing slopes upwardly from the opposite end of the anchor; with the result that the channels 21 are of less vertical depth at one of their ends, as shown in Figure 3.

The opening between the side wings formed by the upper off-set walls 17 is intended to receive an elongated seat member 22, which preferably is transversely slightly arcuate with its upper face dished throughout its length as shown in Figures 4 and 7, to provide a long bearing support for the lower part of the pipe 16. The opposite longitudinal sides of the seat member 22 are each provided with a pair of spaced upstanding lugs 23, 23 which are adapted to form interlocking engagement with the side wall lugs 18, 18, thereby locking the seat member 22 against longitudinal movement and causing any pipe shifting forces or longitudinal movement to be transmitted to the body member of the anchor and hence to the car underframe.

The seat member 22 is adapted to be securely held in firm clamping relation with the pipe by a circular wedge member 24, which, at diametrically opposite sides, is provided with the sectoral flanges or peripheral extensions 25, 25. The portion of the wedge member 24, intermediate the peripheral extensions 25, is of diameter slightly less than the opening between the flanges 20, 20 at the bottom of the main member or casting 11, to permit the upward insertion of the wedge member between the lower flanged ends of the wings when the peripheral extensions 25, 25 are positioned in the direction of the open ends of the anchor, namely in a direction parallel with the pipe to be clamped, as shown in Figure 6; while the peripheral extensions 25, 25 are adapted to extend into the channels 21 formed in the off-set portions 19 of the anchor wings or sides 15 when the wedge member is rotated into pipe clamping position, as shown in Figure 5.

The sectoral flanges or peripheral extensions 25 are made of gradually increasing vertical thickness toward the lower exposed side of the wedge member, in keeping with the sloping top surfaces of the flanges 20, 20 at the bottom of the anchor, as shown in Figures 2, 3 and 4, with the larger ends of the sectoral flanges of greater dimensions than the reduced ends of the channels 21, so as to necessitate rotation of the wedge member in one direction for insertion of the sectoral flanges 25, 25 into the respective channels 21 and at the same time prevent too far rotation beyond the maximum wedging position of the member.

The lower exposed sides of the wedge member 24, preferably coincident with the reduced ends of the peripheral extensions 25, is shown provided with a pair of radially disposed lugs 26, for the purpose of rotating the wedge member into wedging and non-wedging positions.

In order to maintain the seat member 22 and the wedge member 24 in assembled relation, the seat member 22 is shown centrally provided with a depending boss or hub-like portion 27, see Figures 3 and 4. This boss or hub-like portion 27 extends through a central hole in the wedge member 24, with the lower end of the boss upset or swaged, thereby providing a swivel connection between the seat member and the wedge member which permits the latter to be freely rotated in the desired direction.

As is apparent from the construction, the anchor readily adapts itself to variations in pipe size and a wide bearing contact with the pipe is obtained after inserting the associated seat member and wedge member through the lower open end of the main member or casting and then rotating the wedge member so as to cause the gradually tapered bottom surfaces of the peripheral extensions 25, 25 to ride on the upwardly sloping flanges 20, 20 at the bottom of the wings or sides of the main member or casting 11. Such rotation of the wedge member causes the seat member 22 to be forced into firm relation with the pipe whose upper side will be held in firm relation with the arcuate surface within the casting, as shown in the drawings. With the seat member 22 interlocked with the main casting, as previously described, the seat member is held against movement, all pipe shifting forces will be delivered to the casting, while the wedge member, which has no contact with the pipe, will not be subjected to pipe movements, so that a firm constant pipe clamping condition will be maintained.

If occasion should require pipe replacement, pressure on the seat member can be easily released by reversing the rotation of the wedge member to a position where the peripheral extensions 25 are disposed at the side openings between the sides or wings of the casting as shown in Figure 6. In this position the seat and wedge unit may be removed through the opening in the bottom of the casting.

It will be understood that the fastening flanges 12 at the top of the casting may be shaped to conform with the underframe construction; the body casting being preferably riveted to the underframe to form an intimate or permanent part thereof; while pivotally connecting the seat member and wedge member as a unit greatly facilitates installation and operation.

The structure described and shown in the drawings is believed to be the best embodiment of my invention, but structural modifications are possible without, however departing from the spirit of my invention as defined in the appended claims.

What I claim is:

1. Pipe anchoring means comprising a main body member provided with spaced apart sides to provide an open-ended pipe receiving socket therebetween; a pipe seat member insertible through the spaced apart ends of said sides; and a rotatable wedge member insertible between the spaced sides of the body member, the body member sides and the wedge member being provided with complemental wedging surfaces whereby the wedge member is locked in place and the seat member forced into pipe clamping condition.

2. Pipe anchoring means comprising a main body member provided with an open ended pipe receiving socket extending therethrough; a pipe seat member insertible into said socket and having off-set surfaces at opposite edges adapted to form interlocking engagement with said body member against movement lengthwisely of the pipe; and a wedge member having rotatable relation with the seat member and adapted to force the latter into frictional relation with the pipe, the body member and said wedge member having complemental surfaces whereby rotation of the wedge member forces the seat member into pipe anchoring condition.

3. Pipe anchoring means comprising a main body member adapted to be immovably secured in place provided with an open ended pipe receiving socket disposed therethrough and open at the unattached end of the member, the side walls of the member removed from the pipe seating end having off-set surfaces and inturned flanges with sloping surfaces disposed inwardly toward the pipe seating end of the socket; a pipe seat member, insertible through the socket opening at the end of the body member, provided at opposite sides with off-set surfaces to effect interengaging relation with said off-set surfaces on the socket side walls and prevent lengthwise movement of the seat member; and a wedge member insertible in the socket above said inturned flanges into bearing relation with the seat member and provided with inclined surfaces adapted to slide on the sloping surfaces of said flanges and thereby wedge the seat member into pipe clamping condition and effect locking engagement with the body member.

4. Pipe anchoring means comprising a main body member adapted to be immovably secured in place and having a pair of spaced apart side walls formed to provide a pipe receiving socket therebetween the free ends of the side walls having inturned flanges with upwardly sloping surfaces, the flange surface of one side wall sloping in a direction opposite to the slope of the flange surface of the opposite side wall, the side walls at a distance above the flanges having laterally disposed lugs; a seat member insertible between said side walls and provided at opposite edges with sockets adapted to receive said laterally disposed lugs and thereby lock the seat member against movement lengthwisely of the pipe; and a wedge member swiveled on said seat member and having peripheral extensions at opposite edges with sloping surfaces adapted to slide on the sloping surfaces of the flanges thereby forcing the seat member into pipe clamping condition and locking the wedge member in said body member.

5. Pipe anchoring means comprising a main body member provided with attaching flanges whereby the member is immovably secured to a portion of a car underframe, said member having a pair of depending spaced apart side walls to provide a pipe receiving passage therebetween, the lower ends of said side walls on their opposing faces having vertically sloping arcuate surfaces, with the surfaces of the two walls sloping in opposite directions; an elongated seat member insertible between said side walls, the longitudinal sides of said member being formed to effect interlocking engagement with said side walls against movement lengthwisely of the pipe; and an annular wedge member swiveled at its center on the bottom of the seat member so as to rotate horizontally, said wedge member at opposite edges having sectoral extensions with opositely sloping lower faces matching the sloping arcuate surfaces of said side walls, whereby rotative movement of the wedge member effects wedging relation with the side walls and forces the seat member into pipe clamping condition.

6. Pipe anchoring means comprising a socketed pipe receiving member; a seat member adapted to engage the opposite side of the pipe and formed to have interlocking engagement with the first member; and a wedge member arranged in bearing relation with the seat member and having rotative relation with the first member, the first member and said wedge member having complemental wedging surfaces.

MALCOLM S. JOHNSON.